United States Patent
Xu

(10) Patent No.: US 8,451,747 B2
(45) Date of Patent: May 28, 2013

(54) METHOD AND DEVICE FOR TRANSMITTING DATA BASED ON TIME DIVISION DUPLEXING (TDD) STANDARD

(75) Inventor: Qinghai Xu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 14 days.

(21) Appl. No.: 13/257,863

(22) PCT Filed: Dec. 16, 2009

(86) PCT No.: PCT/CN2009/075626
§ 371 (c)(1),
(2), (4) Date: Jan. 6, 2012

(87) PCT Pub. No.: WO2011/006336
PCT Pub. Date: Jan. 20, 2011

(65) Prior Publication Data
US 2012/0106406 A1 May 3, 2012

(30) Foreign Application Priority Data
Jul. 13, 2009 (CN) .......................... 2009 1 0088275

(51) Int. Cl.
*H04L 12/26* (2006.01)
(52) U.S. Cl.
USPC ........................................................ 370/252
(58) Field of Classification Search
None
See application file for complete search history.

(56) References Cited

U.S. PATENT DOCUMENTS

| 6,963,534 | B1 | 11/2005 | Shorey et al. |
| 2005/0068965 | A1* | 3/2005 | Lin et al. .................. 370/395.21 |
| 2005/0201319 | A1 | 9/2005 | Lee et al. |
| 2008/0123595 | A1* | 5/2008 | Lindheimer et al. .......... 370/331 |
| 2009/0149189 | A1* | 6/2009 | Sammour et al. ............. 455/450 |
| 2012/0106406 | A1* | 5/2012 | Xu ................................ 370/280 |

OTHER PUBLICATIONS

International Search Report in international application No. PCT/CN2009/075626, mailed on Apr. 22, 2010.
English Translation of the Written Opinion of the International Search Authority in international application No. PCT/CN2009/075626, mailed on Apr. 22, 2010.

* cited by examiner

*Primary Examiner* — Raj Jain
(74) *Attorney, Agent, or Firm* — Oppedahl Patent Law Firm LLC

(57) ABSTRACT

The present disclosure discloses a method for transmitting data based on a Time Division Duplexing (TDD) standard, the method includes: setting a control parameter for analyzing and processing IP packet; receiving the IP packet from an IP layer and storing the IP packet into a receiving buffer according to the control parameter; scanning the IP packet in the receiving buffer, analyzing packet header information of the IP packet, adjusting a sending order of the IP packet according to the control parameter and sending the IP packet to a sending buffer according to the sending order; and sending the IP packet in the sending buffer to a Packet Data Convergence Protocol (PDCP) entity according to the sending order. The present disclosure further discloses a method for transmitting data based on a TDD standard.

20 Claims, 3 Drawing Sheets

METHOD AND DEVICE FOR TRANSMITTING DATA BASED ON TIME DIVISION DUPLEXING (TDD) STANDARD

TECHNICAL FIELD

The present disclosure relates to the field of a data transmission technology in mobile communications, in particular to a method and device for transmitting data based on a Time Division Duplexing (TDD) standard.

BACKGROUND

In a mobile communication system, if a physical layer is based on a TDD standard, uplink and downlink communications between a base station and a mobile station adopt different time slots of a same frequency channel (i.e., a carrier) to separate receiving and transmitting channels in terms of time, that is to say, the base station sends a signal to the mobile station during a time period and the mobile station sends a signal to the base station during another time period.

Along with the successful commercialization of a Time Division-Synchronous Code is Division Multiple Access (TD-SCDMA) technology and the trial commercialization of a Time Division Duplexing Long Term Evolution (TDD-LTE) technology, a user terminal (i.e., User Equipment (UE)) whose physical layer is based on the TDD standard is more and more popular. The architecture of a system based on the TDD standard is shown in FIG. 1; a subscriber accesses to the Internet through a UE to operate an application program based on Transmission Control Protocol (TCP)/Internet Protocol (IP); the UE interacts with a network side through a data packet based on the IP and Packet Data Convergence Protocol (PDCP) and can access various network resources to meet the requirements of study, jobs and living.

During the networking of an operator, uplink and downlink time slots based on the TDD can be dynamically adjusted and a subscriber needs more downlink data, so that the operator generally configures more transmission time slots than receiving time slots at the network side, which results in a high data download speed and a low data upload speed as for the user experience. Generally, during file downloading through Point to Point (P2P) software, a subscriber also performs file uploading at the same time, which will cause large uploading flow, so the data uploading of the UE becomes the bottleneck at the moment. The P2P software generally performs transmitting based on the TCP, and at the TCP layer, the UE needs to return an acknowledgement (ACK) type control packet every time it receives a TCP data packet from the network side. Each IP and TCP data packet has a packet header of 20 bytes respectively, while an Maximum Transmission Unit (MTU) is generally 1,500 bytes, which means at least 40 bytes of uploading data will be generated every time 1,500 bytes of data are downloaded from the network side; that is to say, when the downlink bandwidth for the subscriber is 1024 bytes, the uplink bandwidth is at least 27 k bytes. However, the receiving time slots configured for the network side are limited during actual networking, i.e., the uplink and downlink are not symmetrical, therefore, in case of large uploading flow of the UE, particularly when multiple application programs concurrently access a network, the application programs of the network side will be in a waiting state because of failing to timely receive the acknowledgement packet of the UE, thereby causing the idleness of an air interface and reducing the downlink capability of the network.

SUMMARY

Therefore, the main aim of the present disclosure is to provide a method and device for transmitting data based on a TDD standard, in order to solve the problem in the related technologies that it may cause the idleness of an air interface and reduce the downlink capability of a network when the large flows are uploaded.

In order to fulfill the aim, the technical solution of the present disclosure is implemented as follows.

The present disclosure provides a method for transmitting data based on a Time Division Duplexing (TDD) standard, comprises:

Setting a control parameter for analyzing and processing an Internet Protocol (IP) packet;

receiving the IP packet from an IP layer and storing the IP packet into a receiving buffer according to the control parameter;

scanning the IP packets in the receiving buffer, analyzing packet header information of the IP packets, adjusting a sending order of the IP packets according to the control parameters and sending the IP packet to a sending buffer according to the sending order; and sending the IP packet in the sending buffer to a Packet Data Convergence Protocol (PDCP) entity according to the sending order.

The control parameter may comprise an IP packet scheduling rule, a receiving buffer size and a sending buffer size.

The IP packet scheduling rule may comprise priority levels of IP packets of different types.

Adjusting the sending order of the IP packet according to the control parameter may specifically comprise:

setting a priority for the IP packet according to the priority levels set for IP packets of different types in the control parameters and adjusting the sending order of the IP packet according to the priority.

Sending the IP packet in the sending buffer to the PDCP entity according to the sending order may specifically comprise:

dividing the sending buffer into a preferred queue and a normal queue, sending the IP packet in the preferred queue preferentially, then sending the IP packet in the normal queue; and stopping sending the IP packet in the preferred queue to start to send the IP packet in the normal queue when the time of sending the IP packet in the preferred queue exceeds a set maximum sending time of the preferred queue.

The method may further comprise:

after receiving the IP packet from the IP layer, detecting the sending buffer, and directly sending the received IP packet to the sending buffer when the sending buffer is determined to be empty, and reporting a sending failure to the IP layer when the sending buffer is determined to be full.

The present disclosure further provides a device for transmitting data based on a Time Division Duplexing (TDD) standard, comprises: a control parameter management module, a data receiving module, an IP packet scheduling module and a data sending module, wherein the control parameter management module is configured to set a control parameter for analyzing and processing an IP packet;

the data receiving module is configured to receive the IP packet from an IP layer and store the IP packet into a receiving buffer of the data receiving module according to the control parameter;

the IP packet scheduling module is configured to scan the IP packet in the receiving buffer, analyze packet header information of the IP packet, adjust a sending order of the IP packets according to the control parameters, and sending the IP packet to a sending buffer of the data sending module according to the sending order; and the data sending module is configured to send the IP packet in the sending buffer to a Packet Data Convergence Protocol (PDCP) entity according to the sending order.

The control parameter may comprise an IP packet scheduling rule, a receiving buffer size and a sending buffer size.

The IP packet scheduling rule may comprise priority levels of IP packets of different types.

The IP packet scheduling module may be further configured to set a priority for the IP packet according to the priority levels set for IP packets of different types in the control parameter and adjust the sending order of the IP packet according to the priority.

The data sending module may be further configured to divide the sending buffer is into a preferred queue and a normal queue, send the IP packet in the preferred queue preferentially, then send the IP packet in the normal queue; and stop sending the IP packet in the preferred queue to start to send the IP packet in the normal queue when the time of sending the IP packet in the preferred queue exceeds a set maximum sending time of the preferred queue.

The data receiving module may be further configured to detect the sending buffer of the data sending module, directly send the received IP packet to the sending buffer when the sending buffer is determined to be empty, and report a sending failure to the IP layer when the sending buffer is determined to be full.

In the method and device for transmitting data based on the TDD standard of the present disclosure, the IP packet conforming to the interests of the subscriber is sent to the network side preferentially according to a flexibly configured IP scheduling rule, to make the network side timely respond to the application program of the UE, thereby greatly preventing an air interface from being idle, increasing the utilization rate of the air interface and the speed of acquiring data from the network side by the subscriber and saving the time of the subscriber; and moreover, the network capacity is increased without the investment of hardware so as to reduce operation cost.

DETAILED DESCRIPTION

Figure 1:
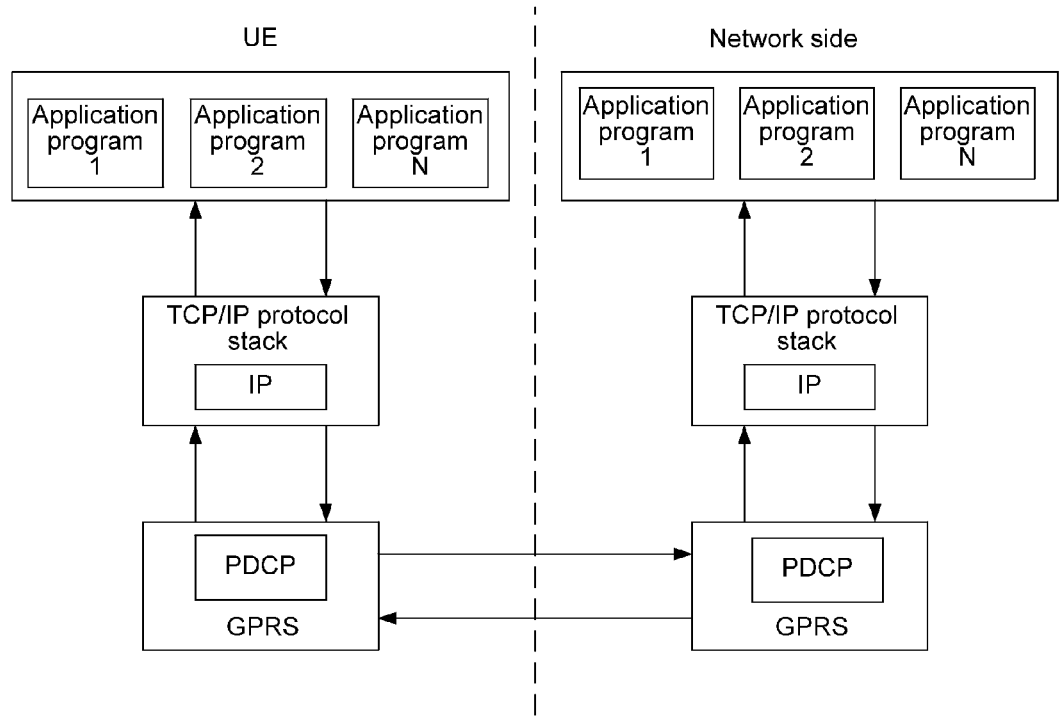
FIG. 1 shows an architecture diagram of a system based on a TDD standard in the related technologies.

The technical solution of the present disclosure is further described below with reference to drawings and specific embodiments in detail.

The core idea of the present disclosure is to preferentially send proper uplink IP packets to a network side according to certain IP packet scheduling rule to reduce the waiting time of the application program of the network side and increase the speed of sending downlink data from the network side to a UE, thereby fully utilizing the data is transmission capability of an air interface and increasing the utilization rate of the air interface. To fulfill the aim, the present disclosure provides a method for transmitting data based on the TDD standard, mainly comprising the following steps of:

Step 1: setting a control parameter for analyzing and processing an IP packet.

A UE is provided with an external interface through which a subscriber can set the control parameter for analyzing and processing the IP packet, wherein the control parameter can include an IP packet scheduling rule, a receiving buffer size, a sending buffer size and the like. Preferably, the IP packet scheduling rule can include priority levels of IP packets of different types, i.e., the priority levels of IP packets are divided according to different types. It should be pointed out that the IP packet scheduling rule is not only limited to the above examples and can be flexibly extended in the practical application, thereby needing no description in the present disclosure.

Step 2: receiving the IP packet from an IP layer and storing the IP packet into a receiving buffer according to the control parameter.

The UE divides the size of the storage space of the receiving buffer according to a set control parameter and the IP packet received by the UE from the IP layer is stored into the divided receiving buffer.

Step 3: scanning the IP packet in the receiving buffer, analyzing packet header information of the IP packet, adjusting a sending order of the IP packet according to the control parameter and sending the IP packet to the sending buffer according to the sending order.

The UE scans the IP packet in the receiving buffer, analyzes the packet header information of the scanned IP packet, adjusts the sending order of the IP packet in the receiving buffer according to the set IP packet scheduling rule and the analyzing result, and sends the IP packet to the sending buffer according to the adjusted sending order, wherein the packet header information of the IP packet comprises: a packet type, a receiver address, a sender address and the like; and the present disclosure supports embodiments performing the analyzing according to any kind of packet header information.

Step 4: sending the IP packet in the sending buffer to a Packet Data Convergence Protocol (PDCP) entity according to the sending order.

The UE sends the IP packet in the sending buffer to a PDCP entity of a General Packet Radio Service (GPRS) protocol stack according to the order of the IP packet in the sending buffer.

Figure 2:
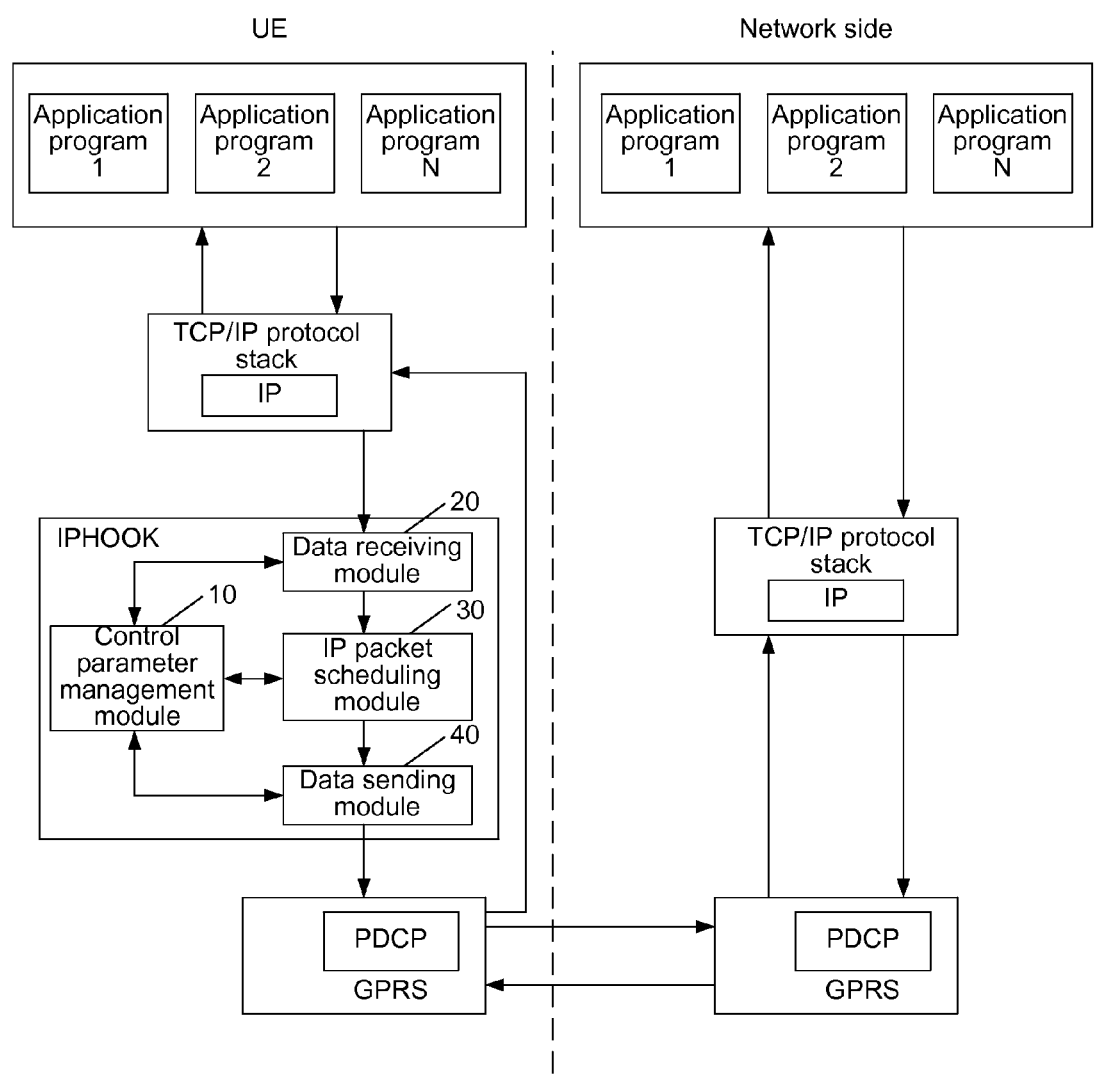
FIG. 2 shows an architecture diagram of a system based on the TDD standard according to the present disclosure.

In order to implement the method for transmitting data, the present disclosure further provides a device for transmitting data based on the TDD standard; the device is also called IPHOOK; in the architecture of a system shown in FIG. 2, the IPHOOK is positioned between a PDCP layer of a GPRS protocol stack of a UE and an IP layer of a TCP/IP protocol stack. The IPHOOK comprises a control parameter management module 10, a data receiving module 20, an IP packet scheduling module 30 and a data sending module 40. The control parameter management module 10 is configured to set a control parameter for analyzing and processing an IP packet, and comprises an external interface through which a subscriber can flexibly set the control parameter, wherein the control parameter comprises an IP packet scheduling rule, a receiving buffer size, a sending buffer size and the like; and in addition, the control parameter management module 10 is also configured to realize persistence of the control parameter and read the control parameter into a memory during power-on. The data receiving module 20 is configured to receive an IP packet from an IP layer and store the IP packet into the receiving buffer of the data receiving module 20 according to the control parameter, wherein the size of the storage space of the receiving buffer is divided according to the control parameters set by the control parameter management module 10. The IP packet scheduling module 30 is configured to scan the IP packet in the receiving buffer, analyze packet header information of the IP packet, adjust a sending order of the IP packets according to the control parameter and send the IP packet to the sending buffer of the data sending module 40 according to the sending order, wherein the packet header information of the IP packet comprises a packet type, a receiver address, a sender address and the like; and the size of the storage space of the receiving buffer is divided according to the control parameter set by the control parameter management module 10. The data sending module 40 is configured to send the IP packet in the sending buffer to a PDCP entity according to the sending order.

Preferably, the IP packet scheduling rule in the control parameter can be priority levels of IP packets of different types. Correspondingly, the IP scheduling module 30 is further configured to set a priority for the IP packet according to the priority levels set for is IP packets of different types in the control parameters and adjust the sending order of the IP packets according to the priorities.

Preferably, the data sending module 40 is further configured to divide the sending buffer into a preferred queue and a normal queue, preferentially send the IP packet in the preferred queue, then send the IP packet in the normal queue, and stop sending the IP packet in the preferred queue to start to send the IP packet in the normal queue when the time of sending the IP packet in the preferred queue exceeds a set maximum sending time of the preferred queue.

Preferably, the data receiving module 20 is further configured to detect the sending buffer of the data sending module 40, directly send the received IP packet to the sending buffer when the sending buffer is determined to be empty, and report a sending failure to the IP layer when the sending buffer is determined to be full.

Figure 3:
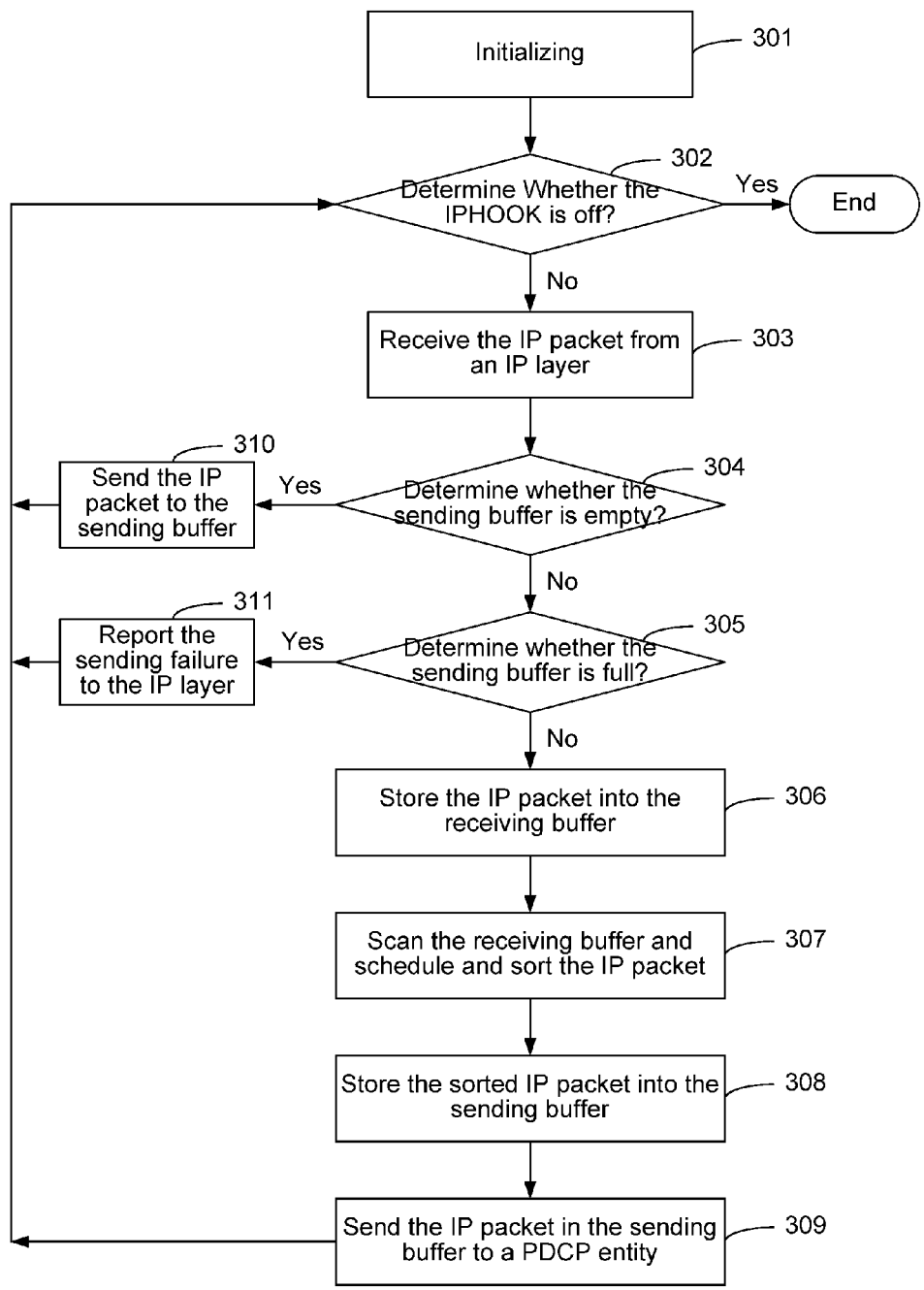
FIG. 3 shows a flow diagram of a method for transmitting data based on the TDD standard according to the present disclosure.

With reference to the architecture of the system shown in FIG. 2, and taking the prioritization performed by the UE according to the type of the IP packet as an example, the method for transmitting data is described below in detail. The following control parameters are set in the embodiment: an IsNeedIPHOOK for indicating whether to enable an uplink IP scheduling function, a receiving buffer size (RecvBufferSize) and a sending buffer size (SendBufferSize), wherein the IsNeedIPHOOK indicates that the uplink IP scheduling function is not enabled when it is 0 and indicates that the uplink IP scheduling function is enabled when it is 1; in addition, the priority levels of IP packets of different types in the IP packet scheduling rule are set as follows: the priority of an Internet Control Message Protocol (ICMP) packet is 0; the priority of a TCP control packet is 1; the priority of other IP packets whose lengths are not over 100 bytes is 2; and the priority of a TCP data packet, a User Datagram Protocol (UDP) data packet and other IP packets whose lengths are over 100 bytes is 3. "0" represents the highest priority, and other priorities decrease in proper order. As shown in FIG. 3, the method for transmitting data in the embodiment comprises the following steps:

S301: after a UE is power-on, the control parameter management module 10 acquires the control parameter from a persistent equipment and initializes the data receiving module 20, the IP packet scheduling module 30 and the data sending module 40.

S302: the data receiving module 20 detects whether the function of the IPHOOK is off or not, if it is off, the whole flow is ended, otherwise, S303 is executed.

The data receiving module 20 acquires the value of the IsNeedIPHOOK in the initialized control parameter, if the value of the IsNeedIPHOOK is 0, it is indicated that the function of the IPHOOK is off, then the memory resources of each module are released, the whole flow is ended and the IP packet is scheduled according to the solution in the related technologies; and if the value of the IsNeedIPHOOK is 1, it is indicated that the function of the IPHOOK is on, then S303 is executed.

S303: the data receiving module 20 receives the IP packet from an IP layer.

S304: the data receiving module 20 detects whether the sending buffer is empty or not, if it is empty, S310 is executed; otherwise, S305 is executed.

S305: the data receiving module 20 detects whether the sending buffer is full or not, if it is full, S311 is executed; otherwise, S306 is executed.

S306: the data receiving module 20 stores the received IP packet into the receiving buffer.

When determining that the sending buffer is neither empty nor full, the data receiving module 20 stores the received IP packet into the receiving buffer.

S307: the IP packet scheduling module 30 scans the IP packet in the receiving buffer, distinguishes whether the IP packet is an ICMP packet, a TCP packet, a UDP packet or other IP packet according to the protocol type value of the IP packet, then continues the classification according to the size of the IP packet, distributes a corresponding priority for each IP packet and sorts the IP packet according to the priority.

The priorities decrease in proper order from 0 to 3 and one with a higher priority is sorted in the front.

S308: the IP packet scheduling module 30 stores the sorted IP packet into the sending buffer.

Preferably, in the embodiment, the sending buffer can be divided into a preferred queue and a normal queue and the IP packets with different priorities are stored separately. Specifically, the IP packets with priorities of 0, 1, 2 are stored into the preferred queue in a diminishing order of the priorities; and the IP packets with a priority of 3 are stored into the normal queue according to its order in the receiving buffer. The IP packets in the preferred queue are sent preferentially and then the IP packets in the normal queue are sent.

S309: the data sending module 40 sends the IP packet in the sending buffer to a PDCP entity of a GPRS protocol stack according to the sorted order.

Preferably, a maximum sending time T of the preferred queue can be set in the control parameter management module 10; the data sending module 40 detects whether there are IP packets in the preferred queue, if there is not, it directly sends the IP packets in the normal queue; and if there is, it sends the IP packets in the preferred queue preferentially, and according to the set T, if the time of sending the IP packets in the preferred queue exceeds the T, it stops sending the IP packets in the preferred queue to start to send the IP packets in the normal queue; and if all the IP packets in the preferred queue have been sent within the T, it continues to send the IP packets in the normal queue. So, the phenomenon that an IP packet in the normal queue cannot be scheduled and sent all the time is avoided.

After S309 is executed, returning to S302 to repeat the whole flow, and the whole flow will not be ended until the function of the IPHOOK is determined to be off by S302.

S310: when the data receiving module 20 detects that the sending buffer is empty, the received IP packet is sent to the sending buffer directly.

This is because, when the sending buffer is empty, it is unnecessary to schedule and sort the received IP packet, and the received IP packet can be sent to the PDCP entity in time. After S310 is executed, returning to S302 to repeat the whole flow, and the whole flow will not be ended until the function of the IPHOOK is determined to be off by S302.

S311: when the data receiving module 20 detects that the sending buffer is full, a sending failure is reported to the IP layer.

When the sending buffer is full, it is indicated that no more IP packet can be scheduled, so that the sending failure is reported to the IP layer. After S311 is executed, returning to S302 to repeat the whole flow, and the whole flow will not be ended until the function of the IPHOOK is determined to be off by S302.

To sum up, in the present disclosure, according to a flexibly configured IP packet scheduling rule, an IP packet conforming to the interests of a subscriber is sent to a network side preferentially to make the network side timely respond to the application program of a UE, thereby greatly preventing an air interface from being idle, increasing the utilization rate of the air interface and the speed of acquiring data from the network is side by a subscriber, and saving the time of the subscriber; and moreover, the network capacity is increased without the investment of hardware so as to reduce operation cost. In addition, the IPHOOK in the present disclosure can be also merged into the IP layer or the PDCP layer, with the same implementing function as that of the IPHOOK in FIG. 2, thereby needing no further description.

What described above are only preferred embodiments of the present disclosure, and the protection scope of the present disclosure is not limited herein.

What is claimed is:

1. A method for transmitting data based on a Time Division Duplexing (TDD) standard, comprising:
    setting a control parameter for analyzing and processing an Internet Protocol (IP) packet;
    receiving the IP packet from an IP layer and storing the IP packet into a receiving buffer according to the control parameter;
    scanning the IP packets in the receiving buffer, analyzing packet header information of the IP packets, adjusting a sending order of the IP packets according to the control parameters, and sending the IP packet to a sending buffer according to the sending order; and
    sending the IP packet in the sending buffer to a Packet Data Convergence Protocol (PDCP) entity according to the sending order.

2. The method for transmitting data based on a TDD standard according to claim 1, wherein the control parameter comprises an IP packet scheduling rule, a receiving buffer size and a sending buffer size.

3. The method for transmitting data based on a TDD standard according to claim 2, wherein the IP packet scheduling rule comprises priority levels of IP packets of different types.

4. The method for transmitting data based on a TDD standard according to claim 3, wherein adjusting the sending order of the IP packets according to the control parameters specifically comprises:
    setting a priority for the IP packet according to the priority levels set for IP packets of different types in the control parameters, and adjusting the sending order of the IP packet according to the priority.

5. The method for transmitting data based on a TDD standard according to claim 1, wherein sending the IP packet in the sending buffer to the PDCP entity according to the sending order specifically comprises:
    dividing the sending buffer into a preferred queue and a normal queue, sending the IP packet in the preferred queue preferentially, then sending the IP packet in the normal queue; and
    stopping sending the IP packet in the preferred queue to start to send the IP packet in the normal queue when the time of sending the IP packet in the preferred queue exceeds a set maximum sending time of the preferred queue.

6. The method for transmitting data based on a TDD standard according to claim 1, further comprising:
    after receiving the IP packet from the IP layer, detecting the sending buffer and directly sending the received IP packet to the sending buffer when the sending buffer is determined to be empty, and reporting a sending failure to the IP layer when the sending buffer is determined to be full.

7. A device for transmitting data based on a TDD standard, comprising: a control parameter management module, a data receiving module, an IP packet scheduling module and a data sending module, wherein
    the control parameter management module is configured to set a control parameter for analyzing and processing an IP packet;
    the data receiving module is configured to receive the IP packet from an IP layer and store the IP packet into a receiving buffer of the data receiving module according to the control parameter;
    the IP packet scheduling module is configured to scan the IP packet in the receiving buffer, analyze packet header information of the IP packet, adjust a sending order of the IP packets according to the control parameters and send the IP packet to a sending buffer of the data sending module according to the sending order; and
    the data sending module is configured to send the IP packet in the sending buffer to a Packet Data Convergence Protocol (PDCP) entity according to the sending order.

8. The device for transmitting data based on a TDD standard according to claim 7, wherein the control parameter comprises an IP packet scheduling rule, a receiving buffer size and a sending buffer size.

9. The device for transmitting data based on a TDD standard according to claim 8, wherein the IP packet scheduling rule comprises priority levels of IP packets of different types.

10. The device for transmitting data based on a TDD standard according to claim 9, wherein the IP packet scheduling module is further configured to set a priority for the IP packet according to the priority levels set for IP packets of different types in the control parameter, and adjust the sending order of the IP packet according to the priority.

11. The device for transmitting data based on a TDD standard according to claim 9, wherein the data sending module is further configured to divide the sending buffer into a preferred queue and a normal queue, send the IP packet in the preferred queue preferentially, then send the IP packet in the normal queue; and stop sending the IP packet in the preferred queue to start to send the IP packet in the normal queue when the time of sending the IP packet in the preferred queue exceeds a set maximum sending time of the preferred queue.

12. The device for transmitting data based on a TDD standard according to claim 7, wherein the data receiving module is further configured to detect the sending buffer of the data sending module, directly send the received IP packet to the sending buffer when the sending buffer is determined to be empty, and report a sending failure to the IP layer when the sending buffer is determined to be full.

13. The method for transmitting data based on a TDD standard according to claim 2, further comprising:
after receiving the IP packet from the IP layer, detecting the sending buffer and directly sending the received IP packet to the sending buffer when the sending buffer is determined to be empty, and reporting a sending failure to the IP layer when the sending buffer is determined to be full.

14. The method for transmitting data based on a TDD standard according to claim 3, further comprising:
after receiving the IP packet from the IP layer, detecting the sending buffer and directly sending the received IP packet to the sending buffer when the sending buffer is determined to be empty, and reporting a sending failure to the IP layer when the sending buffer is determined to be full.

15. The method for transmitting data based on a TDD standard according to claim 4, further comprising:
after receiving the IP packet from the IP layer, detecting the sending buffer and directly sending the received IP packet to the sending buffer when the sending buffer is determined to be empty, and reporting a sending failure to the IP layer when the sending buffer is determined to be full.

16. The method for transmitting data based on a TDD standard according to claim 5, further comprising:
after receiving the IP packet from the IP layer, detecting the sending buffer and directly sending the received IP packet to the sending buffer when the sending buffer is determined to be empty, and reporting a sending failure to the IP layer when the sending buffer is determined to be full.

17. The device for transmitting data based on a TDD standard according to claim 8, wherein the data receiving module is further configured to detect the sending buffer of the data sending module, directly send the received IP packet to the sending buffer when the sending buffer is determined to be empty, and report a sending failure to the IP layer when the sending buffer is determined to be full.

18. The device for transmitting data based on a TDD standard according to claim 9, wherein the data receiving module is further configured to detect the sending buffer of the data sending module, directly send the received IP packet to the sending buffer when the sending buffer is determined to be empty, and report a sending failure to the IP layer when the sending buffer is determined to be full.

19. The device for transmitting data based on a TDD standard according to claim 10, wherein the data receiving module is further configured to detect the sending buffer of the data sending module, directly send the received IP packet to the sending buffer when the sending buffer is determined to be empty, and report a sending failure to the IP layer when the sending buffer is determined to be full.

20. The device for transmitting data based on a TDD standard according to claim 11, wherein the data receiving module is further configured to detect the sending buffer of the data sending module, directly send the received IP packet to the sending buffer when the sending buffer is determined to be empty, and report a sending failure to the IP layer when the sending buffer is determined to be full.

* * * * *